(12) United States Patent
Hsieh et al.

(10) Patent No.: US 8,598,469 B2
(45) Date of Patent: Dec. 3, 2013

(54) ELECTRONIC DEVICE ENCLOSURE

(75) Inventors: Chung-Cheng Hsieh, New Taipei (TW);
Chieh-Chen Chen, New Taipei (TW);
Li-Ping Chen, New Taipei (TW); Ying Gao, Shenzhen (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 5 days.

(21) Appl. No.: 13/482,108

(22) Filed: May 29, 2012

(65) Prior Publication Data
US 2013/0153287 A1   Jun. 20, 2013

(30) Foreign Application Priority Data

Dec. 14, 2011   (CN) .......................... 2011 1 0415961

(51) Int. Cl.
*H05K 9/00* (2006.01)
*H05K 5/00* (2006.01)

(52) U.S. Cl.
USPC ....................... 174/382; 174/386; 361/679.33

(58) Field of Classification Search
USPC ...................... 174/382, 386; 361/818, 679.33
See application file for complete search history.

(56) References Cited

U.S. PATENT DOCUMENTS

| | | | |
|---|---|---|---|
| 6,288,330 B1* | 9/2001 | Chen | 174/382 |
| 6,349,041 B1* | 2/2002 | Hayward et al. | 361/818 |
| 6,395,976 B1* | 5/2002 | Koradia et al. | 174/359 |
| 6,469,912 B1* | 10/2002 | Chuang | 361/816 |
| 6,822,877 B2* | 11/2004 | Chen | 361/801 |
| 7,491,901 B2* | 2/2009 | Lu | 174/386 |
| 7,638,717 B1* | 12/2009 | Yeates et al. | 174/382 |
| 7,701,702 B2* | 4/2010 | Chen et al. | 361/679.33 |
| 8,254,107 B2* | 8/2012 | Chang | 361/679.33 |
| 2008/0245562 A1* | 10/2008 | Meyer et al. | 174/372 |

* cited by examiner

*Primary Examiner* — Hung Ngo
(74) *Attorney, Agent, or Firm* — Altis Law Group, Inc.

(57) ABSTRACT

An electronic device enclosure includes a first cover, a second cover located below the first cover, and a bracket for receiving a disk drive. The second cover defining a hole and comprising a shielding panel covering the hole. The shielding panel is deformable to expose the hole, for the disk drive inserting into or being removed out of the bracket.

17 Claims, 7 Drawing Sheets

ELECTRONIC DEVICE ENCLOSURE

BACKGROUND

1. Technical Field

The present disclosure relates to an enclosure for electronic devices.

2. Description of Related Art

Electronic device enclosure, such as a computer chassis, often receives a plurality of disk drives. To perform maintenance on the plurality of disk drives, a cover of the electronic device enclosure needs be removed from the electronic device enclosure for removing the plurality of disk drives from the electronic device enclosure. However, when the cover is moved, the other electronic components in the electronic device enclosure will be exposed to the air outside. Therefore, there may be room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
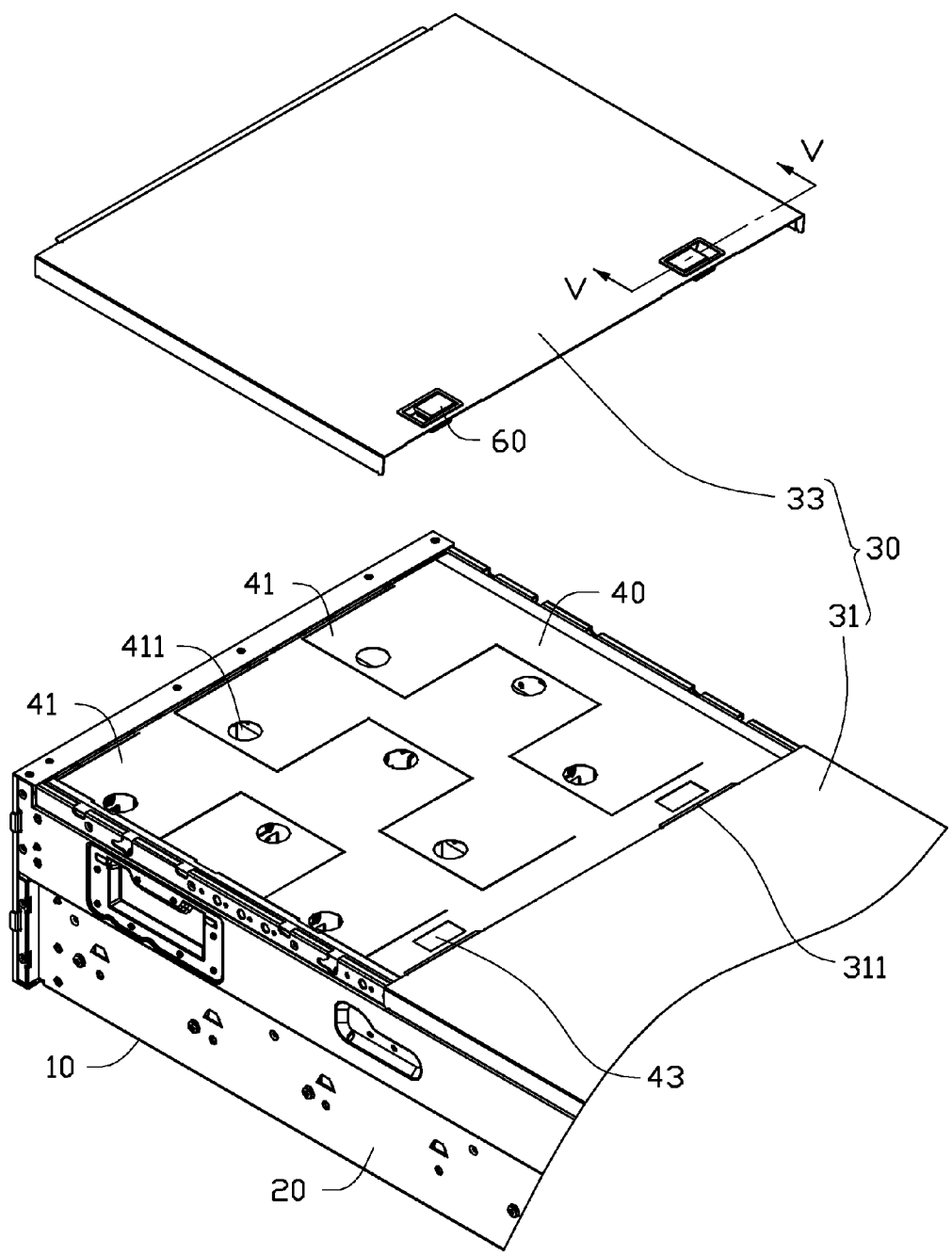
FIG. 1 is an exploded, isometric view of an electronic device enclosure in accordance with an embodiment, and a shielding panel of the electronic device enclosure is situated in a closed position.
Figure 2:
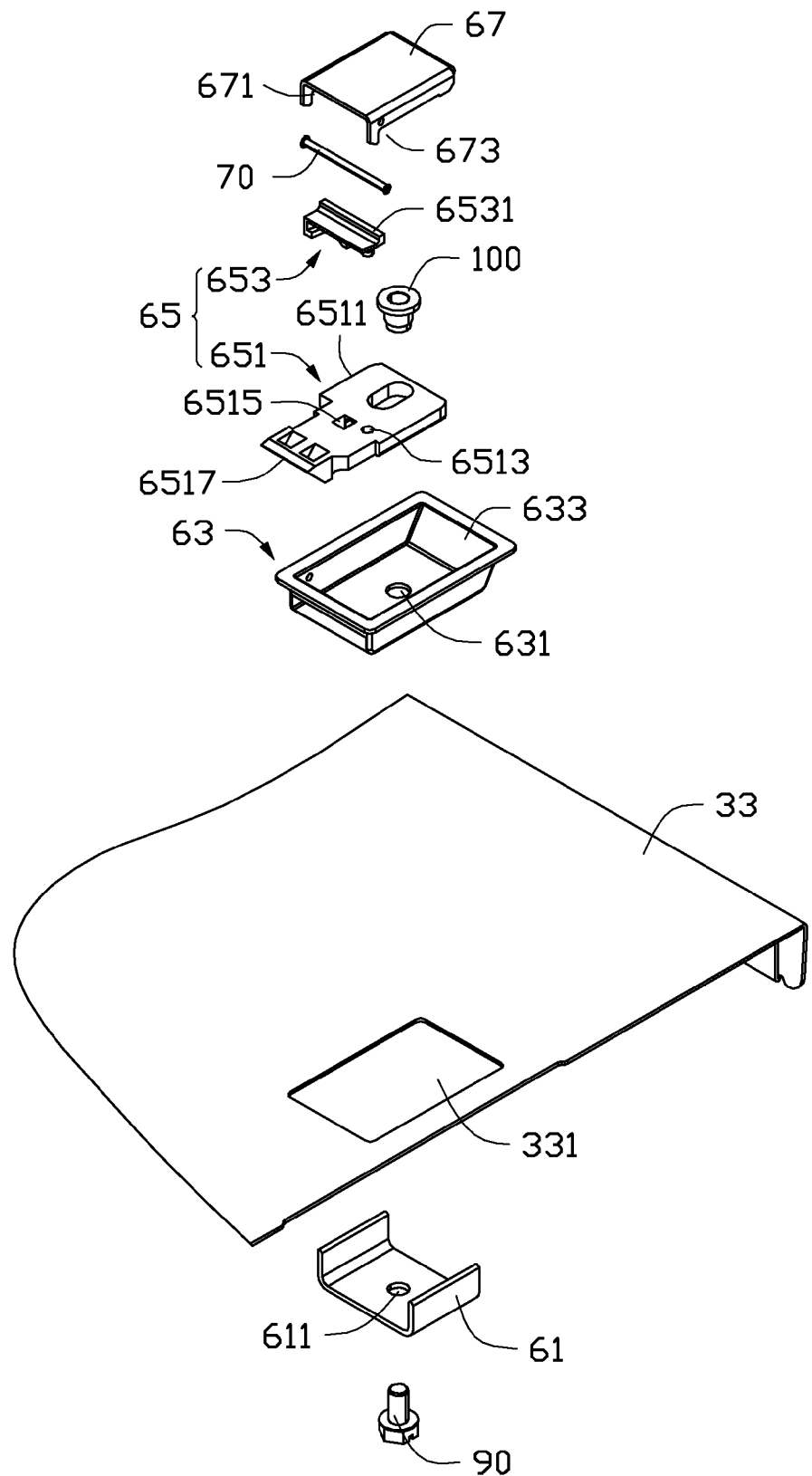
FIG. 2 is an exploded, isometric view of a first part and two clipping members of the electronic device enclosure of FIG. 1.
Figure 3:
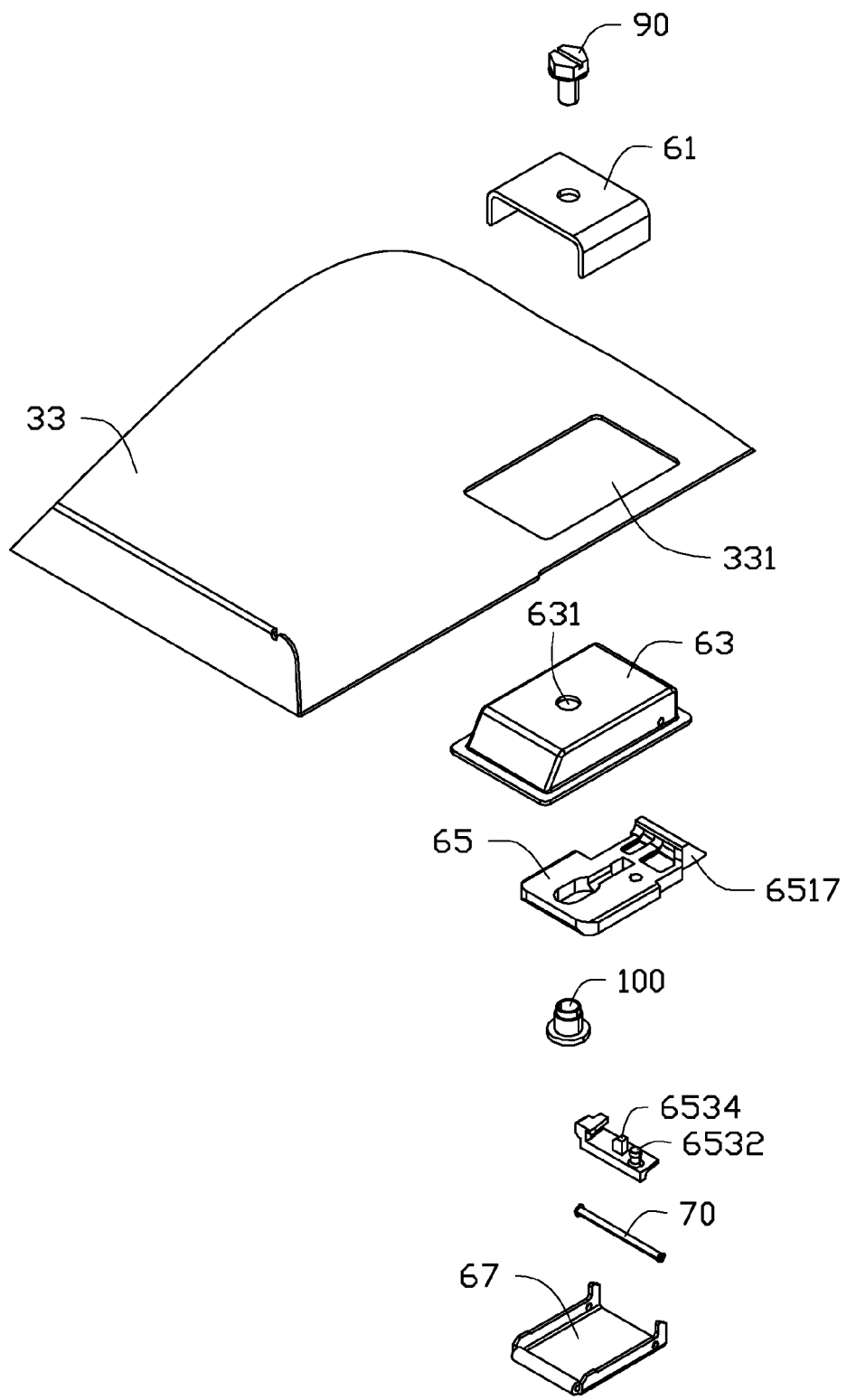
FIG. 3 is similar to FIG. 2, but viewed from a different aspect.

Referring to FIGS. 1 and 2, an electronic device enclosure in accordance with an embodiment includes a bottom plate 10, two side plates 20, a first cover 30, a second cover 40 attached to the first cover 30, and a bracket 50 (shown in FIG. 7) attached to the bottom plate 10. In one embodiment, the electronic device enclosure may be a server chassis, and the second cover 40 is substantially parallel to the first cover 30.

The first cover 30 includes a first part 31 and a second part 33. Two flanges 311 extend from an edge of the first part 31 and towards the second part 33. The second part 33 defines two through holes 331, and the second part 33 is moveably attached to the first part 31 by two clipping members 60.

Each of the two clipping members 60 includes a securing panel 61, a receiving portion 63, a sliding portion 65, and a driving portion 67. The securing panel 61 can be secured to the second cover 40 by known means, such as screws or hooks. In one embodiment, the securing panel 61 is U-shaped and abuts a bottom surface of the second cover 40. A securing hole 611 is defined in the securing panel 61. The receiving portion 63 can extend through the hole 331 and abut the securing panel 61. A receiving hole 631 and two engaging holes 633 are defined in the receiving portion 63.

The sliding portion 65 includes a first sliding block 651 and a second sliding block 653 attached to the first sliding block 651. The first sliding block 651 defines a sliding slot 6511, a positioning hole 6513, and a clipping hole 6515. A hook 6517 extends from an end of the first sliding block 651. A limiting portion 6531 extends from a first side of the second sliding block 653, and a positioning post 6532 and a clipping post 6534 extend from a second opposite side of the second sliding block 653.

The driving portion 67 includes two blocking tabs 671 and two mounting holes 673. The two mounting holes 673 are used to secure a driving post 70. Each of the two mounting holes 673 is adjacent to each of the two blocking tabs 671.

The second cover 40 includes a plurality of shielding panels 41, and two openings 43 are defined in the second cover 40 corresponding to the two through holes 331. In one embodiment, the second cover 40 is Mylar that is made of polyester-type polymer. In one embodiment, no gap is defined between each adjacent pairs of the plurality of shielding panels 41. Each of the plurality of shielding panels 41 is a rectangle and includes four edges. One of the four edges is connected to the second cover 40, and each of the three remaining edges is a free edge. An operating portion 411 is defined in each of the plurality of shielding panels 41. In one embodiment, the operating portion 411 can be a hole, and the hole may be round. Each of the plurality of shielding panels 41 can be deformed in a direction away from the second cover 40, to define an hole 80 (shown in FIG. 70) between each of the plurality of shielding panels 41 and the second cover 40. In one embodiment, the plurality of shielding panels 41 are divided into three rows. Each of the three rows is arranged at the second cover 40 in a direction substantially parallel to the side plate 20. Every adjacent two of the plurality of shielding panels 41, on each of the three rows, are deformed in opposite direction.

Figure 4:
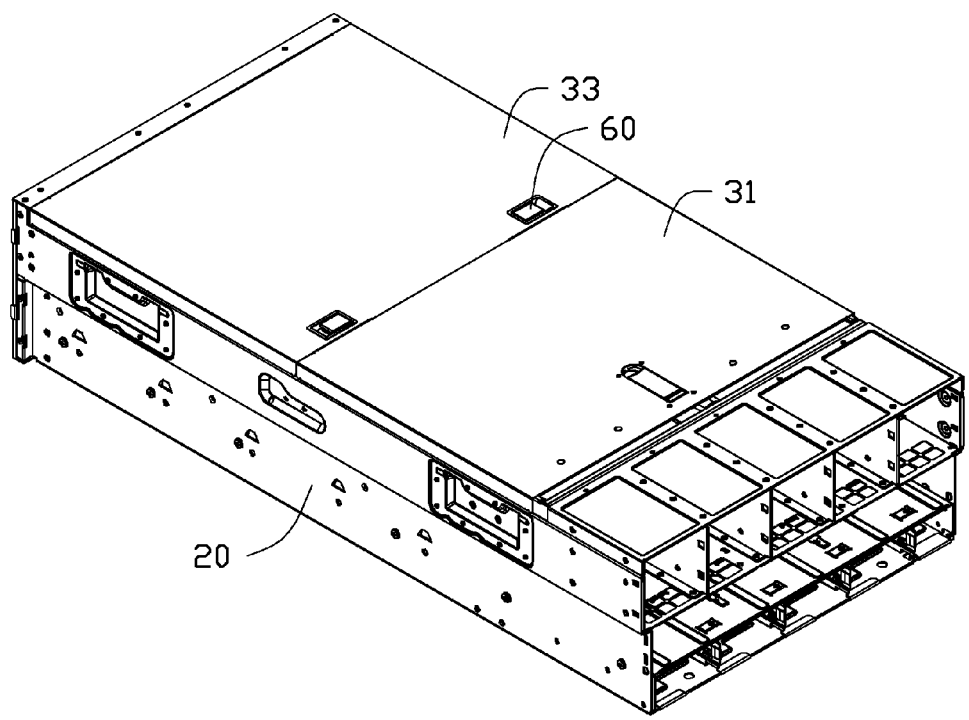
FIG. 4 is an assembled view of FIG. 1.
Figure 5:
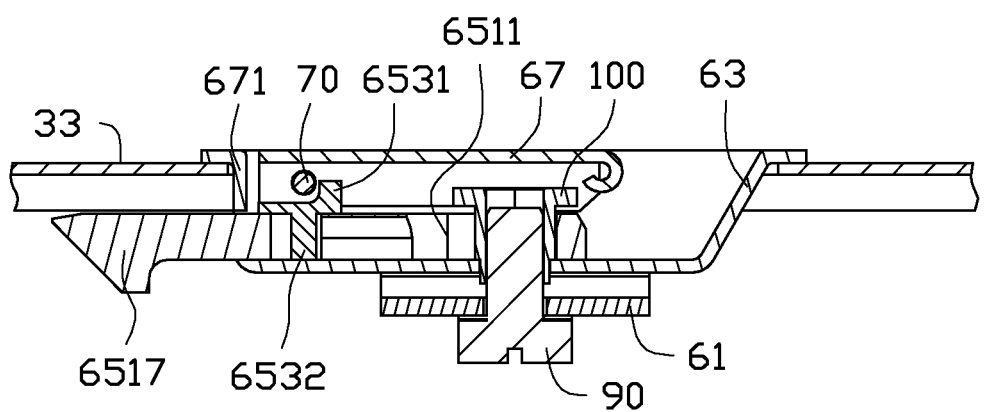
FIG. 5 is a partially cross section view of FIG. 4 along line V-V.
Figure 6:
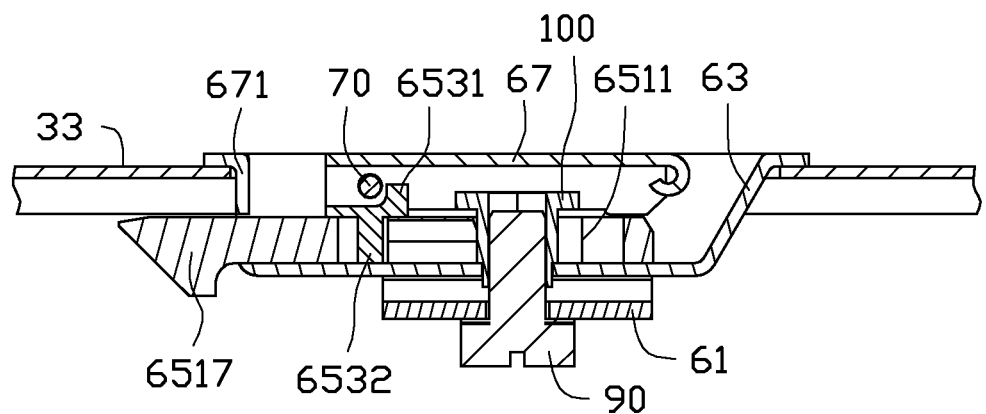
FIG. 6 is similar to FIG. 5, but viewed from a different aspect.

Referring to FIGS. 4-6, in assembly, the second part 33 is placed on the second cover 40. The securing panel 61 abuts the bottom surface of the second cover 40 and secured to the second cover 40. The opposite side panels (not labeled) of the securing panel 61 are respectively aligned with the opposite edges of the opening 43. The receiving portion 63 extends through the through hole 331 and the opening 43, and abuts the securing panel 61.

The first sliding block 651 extends through the engaging hole 633 to receive in the receiving portion 63. The sliding slot 6511 is aligned with the receiving hole 631 and the securing hole 611. A first positioning member 90 extends through the securing hole 611, the receiving hole 631, and the sliding slot 6511. A second positioning member 100 is engaged with the first positioning member 90, to secure the securing panel 61 to the receiving portion 63 and the first sliding block 651. At this point, the second positioning member 100 is located on a first end of the sliding slot 6511, and the hook 6517 is engaged with the bottom surface of the second cover 40.

The positioning post 6532 is engaged in the positioning hole 6513, and the clipping post 6534 is clipped in the clipping hole 6515, to secure the second sliding block 653 to the first sliding block 651.

The driving post 70 is received in the mounting holes 673, to secure the driving post 70 to the driving portion 67. At this point, the two blocking tabs 671 abuts the opposite sides of the first sliding block 651, and the driving post 70 abuts the limiting portion 6531.

In assembly of the first cover 30, the driving post 70 moves the second sliding block 653 in a first direction that is substantially parallel to the second cover 40. The first sliding block 651 is moved in the first direction, until the second positioning member 100 is located on a second opposite end of the sliding slot 6511, for preventing the sliding portion 65. The hook 6517 is disengaged from the second cover 40 and located in the opening 43. The second part 33 is moved, and the hook 6517 is removed from the opening 43. Thus, the second part 33 can remove the receiving portion 63, the sliding portion 65, and the driving portion 67 together from the second cover 40.

The first cover 30 is attached to the two side plates 20. The second cover 40 is attached to the two side plates 20 and abuts the two flanges 311. The hook 6517 extends through the opening 43. The driving post 70 moves the second sliding block 653 in a second direction opposite to the first direction. Thus, the first sliding block 651 is moved in the second direction until the second positioning member 100 is located on a second opposite end of the sliding slot 6511. At this point, the hook 6517 abuts the second cover 40.

Figure 7:
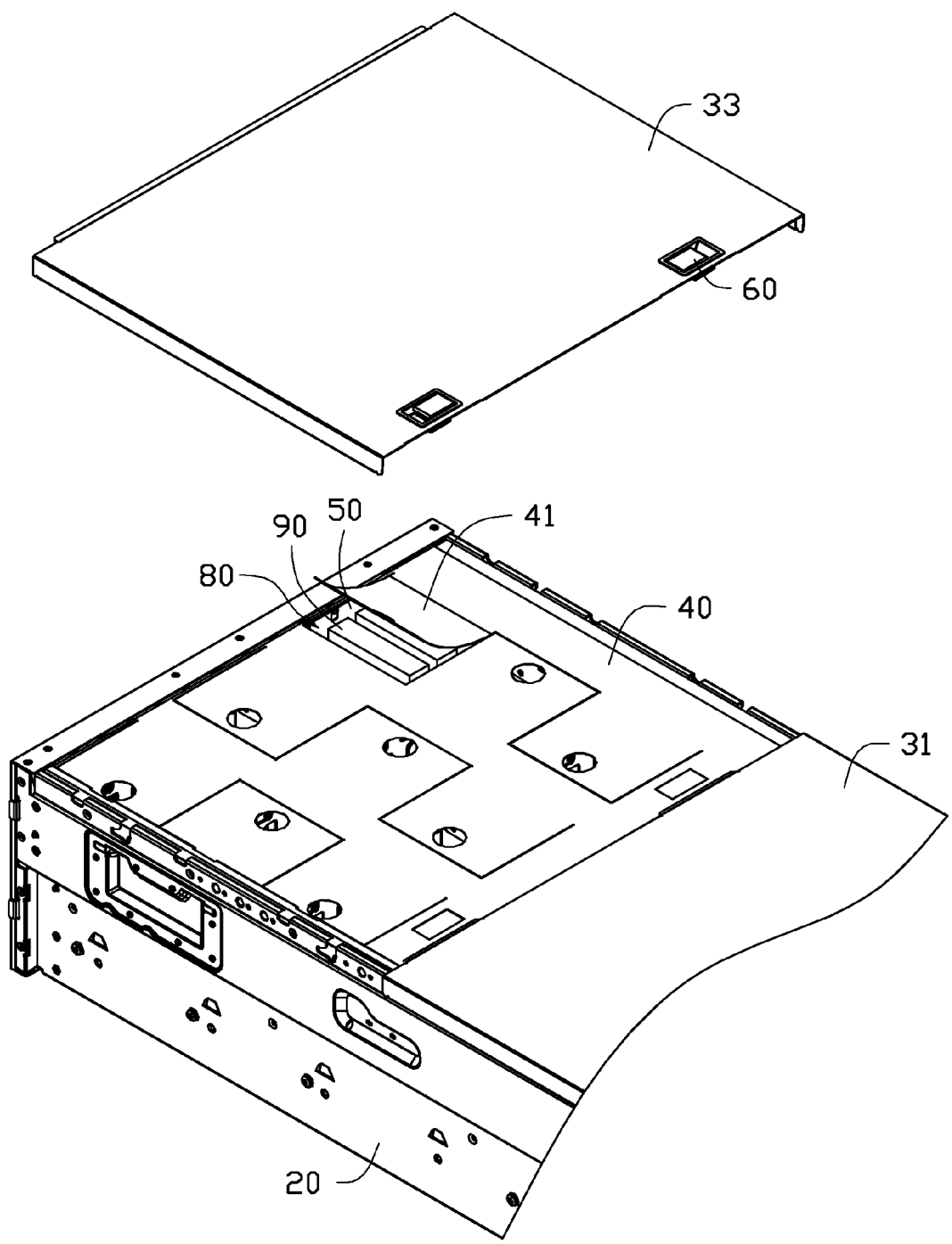
FIG. 7 is similar to FIG. 1, and the shielding panel of the electronic device enclosure is located in an open position.

Referring to FIG. 7, when a disk drive 90 in the bracket 50 needs maintenance, the driving portion 67 is moved, and the hook 6517 is disengaged from the opening 43. Thus, the second part 33 is detached from the first part 31, and the second cover 40 is exposed. The shielding panel 41 is deformed in the direction away from the second cover 40, to expose the hole 80. Therefore, the disk drive 90 can be removed from the bracket 50 via the hole 80.

In one embodiment, only the shielding panel 41 above the disk drive that needs maintenance is deformed, and other shielding panels 41 do not need maintenance. Thus, the electronic components in the electronic device enclosure will not be exposed, and the airflow in the electronic device enclosure can work effectively.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
a first cover;
a second cover located below the first cover, the second cover defining a hole and comprising a shielding panel extending from the hole, and the shielding panel covers the hole; and
a bracket adapted for receiving a disk drive;
wherein the hole communicates with bracket, and the shielding panel is deformable to expose the hole.

2. The electronic device enclosure of claim 1, wherein shielding panel comprises four edges, one of the four edges is connected to the second cover, and each of three of the four edges comprises a free edge.

3. The electronic device enclosure of claim 1, wherein the shielding panel is a rectangle.

4. The electronic device enclosure of claim 1, wherein the shielding panel comprises an operating portion, and the shielding panel is deformed by the operating portion.

5. The electronic device enclosure of claim 1, wherein the first cover comprises a first part and a second part moveably attached to the first part, and the second part is attached to the bracket.

6. The electronic device enclosure of claim 5, wherein the first part comprises a flange abutting the second part, a clipping member is secured to the second part, and the second part is secured to the first part by the clipping member.

7. The electronic device enclosure of claim 6, wherein the clipping member comprises a securing panel attached to the second cover; a receiving portion secured to the first part, a sliding portion slidably attached to the receiving portion, and a driving portion; the second cover defines an opening; the sliding portion comprises a hook, and the hook extends through the opening to abut an bottom surface of the second cover.

8. The electronic device enclosure of claim 7, wherein the securing panel is U-shaped and abuts the bottom surface of the second cover.

9. An electronic device enclosure comprising:
a first cover comprising a first part and a second part moveably attached to the first part;
a second cover, located below the second part, comprising a plurality of shielding panels; and
a bracket, located below the second cover, adapted for receiving a disk drive;
wherein the second part is moveable relative to the first part to expose the second cover; each of the plurality of shielding panels is deformable in a direction away from the second cover, to define a hole between the second cover and each of the plurality of shielding panels; and the hole communicates with the bracket.

10. The electronic device enclosure of claim 9, wherein no gap is defined between every adjacent two of the plurality of shielding panels.

11. The electronic device enclosure of claim 9, wherein each of the plurality of shielding panels comprises four edges, one of the four edges is connected to the second cover, and each of three of the four edges comprises a free edge.

12. The electronic device enclosure of claim 9, further comprising a side plate, wherein the plurality of shielding panels are divided to at least one rows arranged at in a direction substantially parallel to the side plate, and every adjacent two of the plurality of shielding panels, on at the least one rows are deformed in opposite direction.

13. The electronic device enclosure of claim 9, wherein each of the plurality of shielding panels is a rectangle.

14. The electronic device enclosure of claim 9, wherein each of the plurality of shielding panels comprises an operating portion, and each of the plurality of shielding panels is deformed by the operating portion.

15. The electronic device enclosure of claim 9, wherein the first part comprises a flange abutting the second part, a clipping member is secured to the second part, and the second part is secured to the first part by the clipping member.

16. The electronic device enclosure of claim 15, wherein the clipping member comprises a securing panel attached to the second cover; a receiving portion secured to the first part, a sliding portion slidably attached to the receiving portion, and a driving portion; the second cover defines an opening; the sliding portion comprises a hook, and the hook extends through the opening to abut an bottom surface of the second cover.

17. The electronic device enclosure of claim 16, wherein the securing panel is U-shaped and abuts the bottom surface of the second cover.

* * * * *